J. Thompson,
Drying Photographic Plates,
No. 44,678. Patented Oct. 11, 1864.
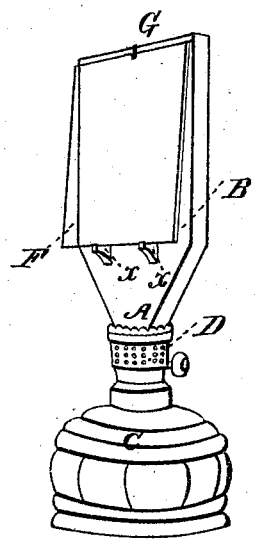
Witnesses.
H B King
Calvin Thurber
Inventor.
Julius Thompson

UNITED STATES PATENT OFFICE.

JULIUS THOMPSON, OF TAUNTON, MASSACHUSETTS.

APPARATUS FOR DRYING PHOTOGRAPHIC PLATES.

Specification forming part of Letters Patent No. 44,678, dated October 11, 1864.

*To all whom it may concern:*

Be it known that I, JULIUS THOMPSON, of Taunton, in the county of Bristol, in the State of Massachusetts, have invented a new and useful device for drying photographic plates and for hardening or baking the varnish that is applied to them; and I do hereby declare that the following is a full, clear, and exact description of the same, reference being had to the annexed drawing, making a part of this specification, in which—

C D represent a common kerosene-lamp and burner. A B is the chimney or flue which is the subject of my invention. The lower part of the chimney A is constructed to fit upon a lamp or gas burner, and as it is continued upward it is brought to a plane surface or surfaces, B, of a size suitable to cover the face of a photographic plate or picture placed opposite it. X X are rests on which to set the plate to be heated, which leans against a projection on the flue G; F, photographic plate.

The operation is as follows: When the flue is hot from the flame within it, place a photographic plate that needs drying or baking upon the rests X X, leaning the top against the projection G. In this position the heat from the flue and the current of hot air that draws up through between the plate and flue or chimney will rapidly and evenly dry or harden the varnish on the plate. A varnished plate baked in this manner receives a peculiarly even and beautiful surface, which I think has not been produced before.

What I claim as my invention is—

The chimney or flue A B, with one or more plane surfaces, as described above, and for the purpose specified.

JULIUS THOMPSON.

Witnesses:
J. E. VICKERY,
H. B. KING.